United States Patent
Coburn et al.

(10) Patent No.: US 9,953,042 B1
(45) Date of Patent: Apr. 24, 2018

(54) MANAGING A DEDUPLICATED DATA INDEX

(71) Applicant: Red Hat, Inc., Raleigh, NC (US)

(72) Inventors: Jonathan Coburn, Cambridge, MA (US); Michael Fortson, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 68 days.

(21) Appl. No.: 13/782,836

(22) Filed: Mar. 1, 2013

(51) Int. Cl.
*G06F 17/00* (2006.01)
*G06F 17/30* (2006.01)

(52) U.S. Cl.
CPC .. *G06F 17/30312* (2013.01); *G06F 17/30327* (2013.01); *G06F 17/30997* (2013.01)

(58) Field of Classification Search
CPC .................. G06F 17/30327; G06F 17/30997
USPC .................. 707/609, 741, 742, 802; 711/173
See application file for complete search history.

(56) References Cited

U.S. PATENT DOCUMENTS

| | | | |
|---|---|---|---|
| 7,941,709 B1* | 5/2011 | Hong et al. | 714/54 |
| 2007/0143459 A1* | 6/2007 | Batteram | G06F 21/6245 709/223 |
| 2012/0198203 A1* | 8/2012 | Resch | G06F 17/30138 711/202 |

* cited by examiner

*Primary Examiner* — Marc Filipczyk
(74) *Attorney, Agent, or Firm* — Withrow & Terranova, PLLC

(57) ABSTRACT

Among other things, in one aspect, in general, a system for managing data in a data storage system includes a plurality of index nodes each storing a map of entries, each entry of the map including an identifier corresponding to a particular portion of data stored in the data storage system, and metadata indicating a location where the particular portion of data is stored in the data storage system, and one or more supernodes configured to return an identification of an index node that recently submitted a request for a particular identifier associated with at least one of the portions of data.

42 Claims, 7 Drawing Sheets

US 9,953,042 B1

MANAGING A DEDUPLICATED DATA INDEX

BACKGROUND

This description relates to managing and indexing deduplicated data.

Some data storage systems are configured to include a deduplication function that is used to reduce the amount of storage capacity that is needed to store received data (e.g., data to be stored in the data storage system). In some implementations, deduplication works by segmenting received data into segments (also called "chunks") of data that are identified in an index by a value, such as a cryptographic hash value. A form of data compression can be achieved by preventing duplicate segments from being stored when the data is being stored in the data storage system. For example, a given file (made up of one or more segments) that has already been stored (e.g., an email attachment attached to multiple emails in an email storage system) can simply be replaced with a reference to the previously stored file if the previously stored file has the same segments. Alternatively, a given segment within a given file that is the same as another segment in the given file or another file (e.g., a portion of document within a ZIP archive that is also stored in another ZIP archive) can be replaced with a reference to the duplicate segment.

SUMMARY

In one aspect, in general, a system for managing data in a data storage system includes a plurality of index nodes each storing a map of entries, each entry of the map including an identifier corresponding to a particular portion of data stored in the data storage system, and metadata indicating a location where the particular portion of data is stored in the data storage system, and one or more supernodes configured to return an identification of an index node that recently submitted a request for a particular identifier associated with at least one of the portions of data.

Implementations of this aspect may include one or more of the following features. The one or more supernodes store maps of entries, each entry of the map including an identifier corresponding to a particular portion of data stored in the data storage system and a name of an index node that recently submitted a request for that identifier. Each identifier stored by one of the supernodes is assigned to the respective supernode based on a function applied to a data value of the identifier. At least some of the supernodes store the identifiers based on a sampling rate applied to the identifiers. At least some of the supernodes delete entries from the map based on an age of each deleted entry. Each index node is assigned to at least one supernode, such that the identifiers stored on each supernode include identifiers stored by the index nodes assigned to that supernode. Each index node is assigned to a single supernode. Each index node is assigned to at least two supernodes. Each map of entries is stored by a single supernode. Each map of entries is stored by at least two supernodes, each of the at least two supernodes storing a portion of the respective map of entries. At least one of the identifiers includes a data value computed from the particular portion of data. At least some of the index nodes are configured to submit a request for an entry of a map corresponding to a particular identifier to an index node identified by the supernode as an index node that recently submitted a request for the particular identifier, before consulting its own map of entries for the particular identifier.

At least some of the index nodes are configured to submit a request, to the index node identified by the supernode, for other entries of the map related to the initially requested entry of the map. The other entries related to the initially requested entry were stored at approximately the same time as the initial entry. The system includes a second supernode configured to return an identification of one of the supernodes that recently submitted a request for a particular identifier associated with at least one of the portions of data. The index node that recently submitted the request for the particular identifier includes the index node that last submitted the request for the particular identifier.

In another aspect, in general, a method for managing data in a data storage system includes, on a first index node, storing identifiers corresponding to a particular portion of data stored in the data storage system and storing metadata indicating a location where the respective particular portion of data is stored in the data storage system, receiving a request to access a first portion of data stored in the data storage system, determining an identifier corresponding to the first portion of data, receiving an identification of a second index node that recently submitted a request for the identifier corresponding to the first portion of data, the second index node storing the identifier corresponding to the first portion of data and storing metadata indicating a location where the first portion of data is stored in the data storage system, and submitting a request to the second index node for the metadata indicating the location where the first portion of data is stored in the data storage system.

Implementations of this aspect may include one or more of the following features. Determining an identifier corresponding to the first portion of data includes computing a data value for the identifier by applying a function to the first portion of data. The function is a hash function. The method includes submitting a request for the identification of a second index node that recently submitted a request for the identifier corresponding to the first portion of data to a supernode storing the identifier corresponding to the first portion of data and a name of the second index node that recently submitted a request for that identifier. The method includes submitting a request to the second index node for metadata indicating locations where other portions of data are stored in the data storage system, the other portions of data having a relation to the portion of data corresponding to the initially requested identifier. The other portions of data related to the portion of data corresponding to the initially requested identifier were stored at approximately the same time as the portion of data corresponding to the initially requested identifier. The index node that recently submitted the request for the particular identifier includes the index node that last submitted the request for the particular identifier.

In another aspect, in general, a system for managing data in a data storage system includes a collection of index nodes and supernodes arranged in a hierarchy, in which each index node is below at least one supernode in the hierarchy, such that a supernode above an index node in the hierarchy indicates to the index node which other index node most recently accessed a portion of data.

In another aspect, in general, a system for managing data in a data storage system includes a plurality of index nodes each storing a map of entries, each entry of the map including an identifier corresponding to a particular portion of data stored in the data storage system, and metadata indicating a location where the particular portion of data is stored in the data storage system, and means for identifying an index node that recently submitted a request for a particular identifier associated with at least one of the portions of data.

Other aspects and advantages will be apparent from the detailed description, drawings, appendices and claims.

DESCRIPTION

A deduplication system can operate using a map of entries each having an identifier corresponding to a particular portion of data, and metadata indicating a location where the particular portion of data is stored. The map of entries, sometimes called an index, can be split among multiple nodes (sometimes referred to as "index nodes"). Each node has an instance of the index, and sends all deduplication requests which may result from data storage activity (e.g., reading or writing data) on that node to its local index. Further, the system may also have one or more "supernodes." A supernode (sometimes called a superindex) keeps track of which index node last interacted with a portion of data (for example, wrote data to a block on a storage medium) so that an index node containing out-of-date information can obtain updated information from another index node.

Figure 1:
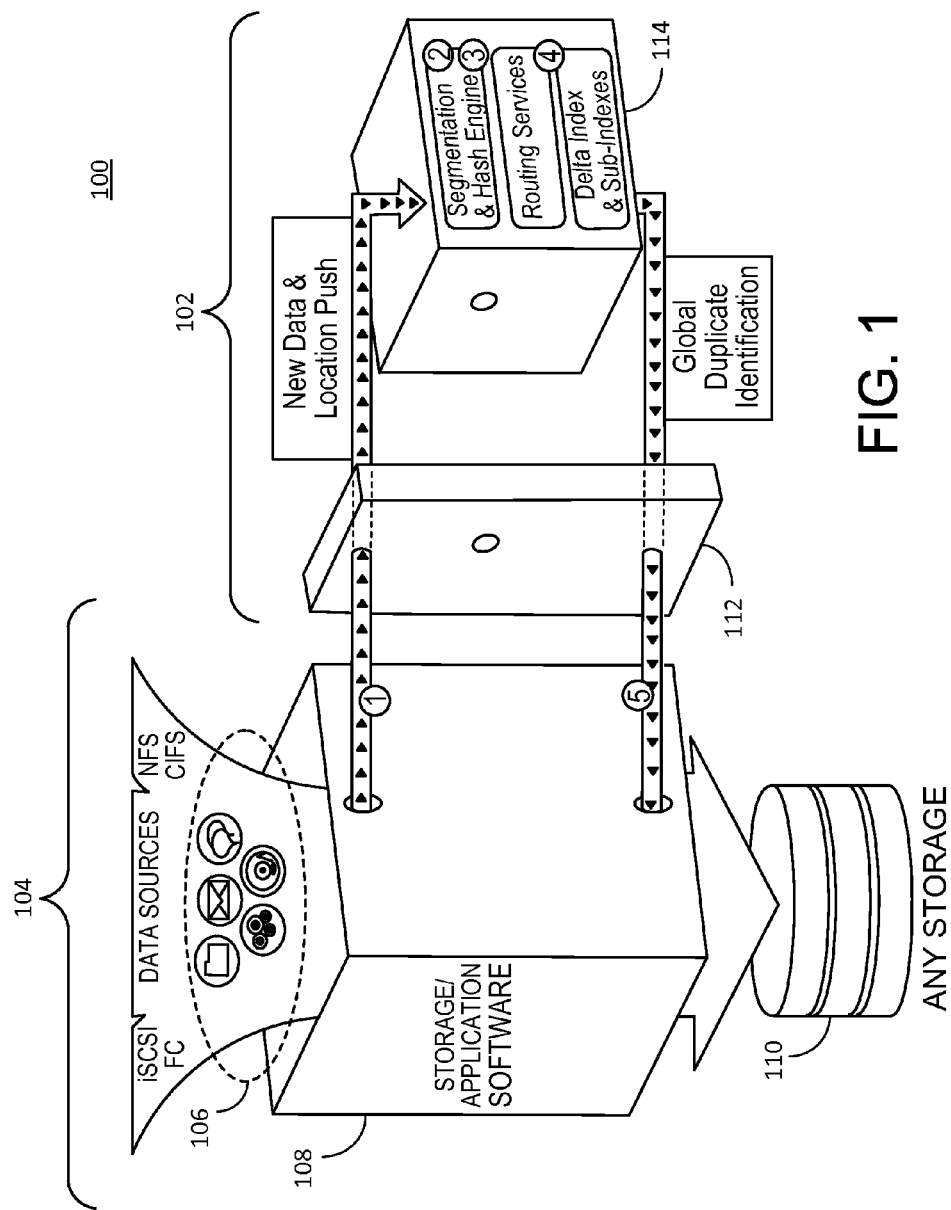
FIG. 1 is a block diagram of a system for managing stored data.

FIG. 1 shows an exemplary system 100 for integrating a deduplication engine 102 into a data storage system 104. The data storage system 104 is configured to receive any of a variety of types of data 106 from one or more data sources. The data 106 can include, for example, different types of files from various file systems, having different data types, and/or corresponding to different applications or operating system layers (e.g., electronic mail, media files or streams, software libraries, etc.). In this example, the system 104 includes a software layer 108 running in an execution environment hosted on one or more general-purpose computers under the control of a suitable operating system. The software layer can be configured as a database, for example, or another type of application that manages stored data. The system 104 also includes one or more storage media 110 within the execution environment accessible to the software layer 108. The execution environment can include a configuration of computer systems or computer system components (e.g., coupled via a local area network (LAN) or a storage-area network (SAN)). In some examples, a storage system other than a file system is used. For example, a storage system such as a block system or object storage system could be used in place of or in addition to a file system.

The deduplication engine 102 can be configured to provide a deduplication function for use by the data storage system 104. In some examples, the deduplication engine 102 may provide an application programming interface (API) 112 that includes various functions that can be called from within the software layer 108 of the data storage system 104.

The software layer 108 can store new data in the media 110, in some examples taking into account advice returned as output of the functions of the API 112 about whether portions of the data have already been stored in the media 110, and if so where the portions are stored. In response to the deduplication advice indicating which new segments of data have duplicates that are already stored, the software layer 108 can determine whether to represent some of the new segments by referring to the previously stored duplicates instead of storing the new segments. In some examples, the deduplication engine 102 is integrated in a storage system in such a way that an API is optional or not used.

When deduplication advice is desired for new data, the software layer 108 provides the new data to the deduplication engine 102 by calling a function of the API 112. The function can be called at any of a variety of stages including: while the new data is being written to the media 110, or at any subsequent time as determined by the software layer 108. Along with the new data, the software layer 108 can provide other input to the function such as application-specific metadata. For example, location information can be provided that describes where the new data is located (e.g., in a temporary storage location within the media 110 or other storage media) in the system 100 or an external location. The software layer 108 is also able to improve the accuracy of the advice from the deduplication engine 102 by calling functions of the API 112 to update the index when data is deleted or modified. In some implementations, the software layer 108 may also provide a sequence number along with the application specific metadata to the function. The software layer 108 can use the sequence number to quickly verify whether or not the deduplication advice is valid. If the location information has changed since the last time the software layer 108 queried the deduplication engine 102, then the sequence number will indicate that the deduplication advice is outdated.

In some implementations, the deduplication advice can be used by a remote user or client of a data storage system 104 to determine if a data segment needs to be transmitted over a network. For example, if the data segment is a duplicate of an existing copy of the segment, then the existing copy of the segment can be referenced instead thus saving network capacity and possibly also storage capacity.

The deduplication engine 102 includes a segmentation and index management module 114 that performs various actions to handle calls to the functions of the API 112. The module 114 segments the new data into fixed- or variable-length segments, optionally taking into account characteristics of the new data to determine appropriate boundaries for the segments. For example, duplicate data may occur in files having different block alignments, such as when a file appears within two ZIP archives at different locations relative to the start of the archive. Content-aware segmentation enables the embedded file to be located and deduplicated even if the file appears at different offsets in the two archives.

The module 114 computes fingerprints as identifiers corresponding to different respective segments. In some implementations, the module 114 computes hash values that uniquely identify different respective segments, and includes the entire hash value or a shorter portion of the hash value or a shorter computed value based on the hash value in the fingerprint. In some implementations, the module 114 uses the SHA-256 cryptographic hashing algorithm designed by the National Security Agency to compute the hash values for the respective segments. For example, techniques for using abbreviated values for the fingerprint are described in U.S. Pat. No. 7,457,800, and U.S. Pat. No. 7,457,813, each of which is incorporated herein by reference.

In some implementations, the fingerprint also includes a domain tag representing a domain in which one or more segments are being stored and managed. For example, the domain tag can corresponds to a section of a file system in which the one or more segments are being stored, a portion of a storage medium including, for example, any of the following: a disk or disk volume (e.g., identified by a logical unit number (LUN)), a data protected set of disks, a storage device, or a cluster of storage devices). The inclusion of the domain tag in the fingerprint enables the system 100 to distinguish between different segments that may have identical content (and therefore identical hash values) but are stored in different media and/or file systems, where it may be difficult to create references between data stored in those different media and/or file systems.

The deduplication engine 102 stores the fingerprints in an index that includes multiple entries, each entry storing one of the fingerprints. Each entry stores a reference to the segment corresponding to the fingerprint stored in the entry.

In some implementations, different data segments may need to be indexed in the same index without being deduplicated across the segments. By way of example, a service provider may have two customer volumes on the same underlying media, but data cannot be shared between volumes. To address this situation, the index may support the creation of a domain identifier or tag (e.g., a namespace) to be associated with each segment (e.g., Client1 and Client2). The data segment associated with the first domain, e.g., Client1, will not deduplicate with the data segment associated with the second domain, e.g. Client2.

When a duplicate segment is identified, a duplicate data advisory can be sent to the software layer 108. In some implementations, the advisory can be synchronously sent via a function return. In some implementations, the advisory can be asynchronously sent via a previously registered callback function. The advisory provides metadata necessary for the software layer 108 to determine the duplicate information. For example, the metadata can include a location of the duplicate data and possibly a sequence number, each corresponding to the new segment and the previously stored segment. In some examples, the software layer 108 may notify the deduplication engine 102 that the advice is outdated (e.g., based on sequence numbers described above). In such instances, the deduplication engine 102 updates its index to remove the outdated information. In some examples, the software layer 108 can unify data extents within the file system specific to the software layer 108 based on the advice.

When a duplicate segment is identified, a reference to the segment can also be stored in a data structure that is separate from the index. In some implementations, the data storage system 104 stores a reference to the location of a duplicate segment using a data structure that is independent of the deduplication engine 102, such as a data structure in the file system inode structure of the media 110, where the data structure is able to point directly to the location where the duplicate data is stored on the media 110 (e.g., a location on a disk). This can provide the advantage of the data storage system 104 being able to operate independently of the deduplication engine 102, without the need to rely on the index to access files that include segments that are references to duplicate segments from other files or locations within the same file. In such implementations, the deduplication engine 102 does not become critical to the reliability and availability of the data storage system 104 for data retrieval.

In alternative implementations, the data storage system 104 only stores the fingerprint value for the duplicate segment. In such implementations, the data storage system 104 would have to query the deduplication engine 102 as to where the referenced segment was located, and the deduplication engine 102 would be critical to the operation of the data storage system 104.

The index can be managed such that the size of the index does not exceed a predetermined maximum size. This enables the deduplication engine 102 to limit the amount of storage space required for the index. The deduplication engine 102 provides deduplication advice for data that falls within a deduplication window corresponding to the most recently "seen" segments in order of how recently they have been seen (e.g., accessed or used). In some implementations, the index can include an on-disk volume for recording names corresponding to the data segments. Using this on-disk volume, the deduplication engine 102 is able to determine the deduplication window for which the engine 102 provides deduplication advice. In some implementations, the index contains identifiers corresponding to entries of a map, and entries of the map correspond to segments of a storage medium.

In some examples, the index can be split among multiple nodes. A node, in the broadest sense, is any entity which is responsible for managing a subset of the segments identified by an index or multiple indices. A node may be a computer system, a program running on a computer system, or a portion of either or both. The use of multiple nodes may enable greater system capacity, for example, by enabling the system to process multiple operations upon entries of the index in parallel. If each node only contains some entries of the index then supernodes can be used to keep track of which nodes contain which entries.

Figure 2A:
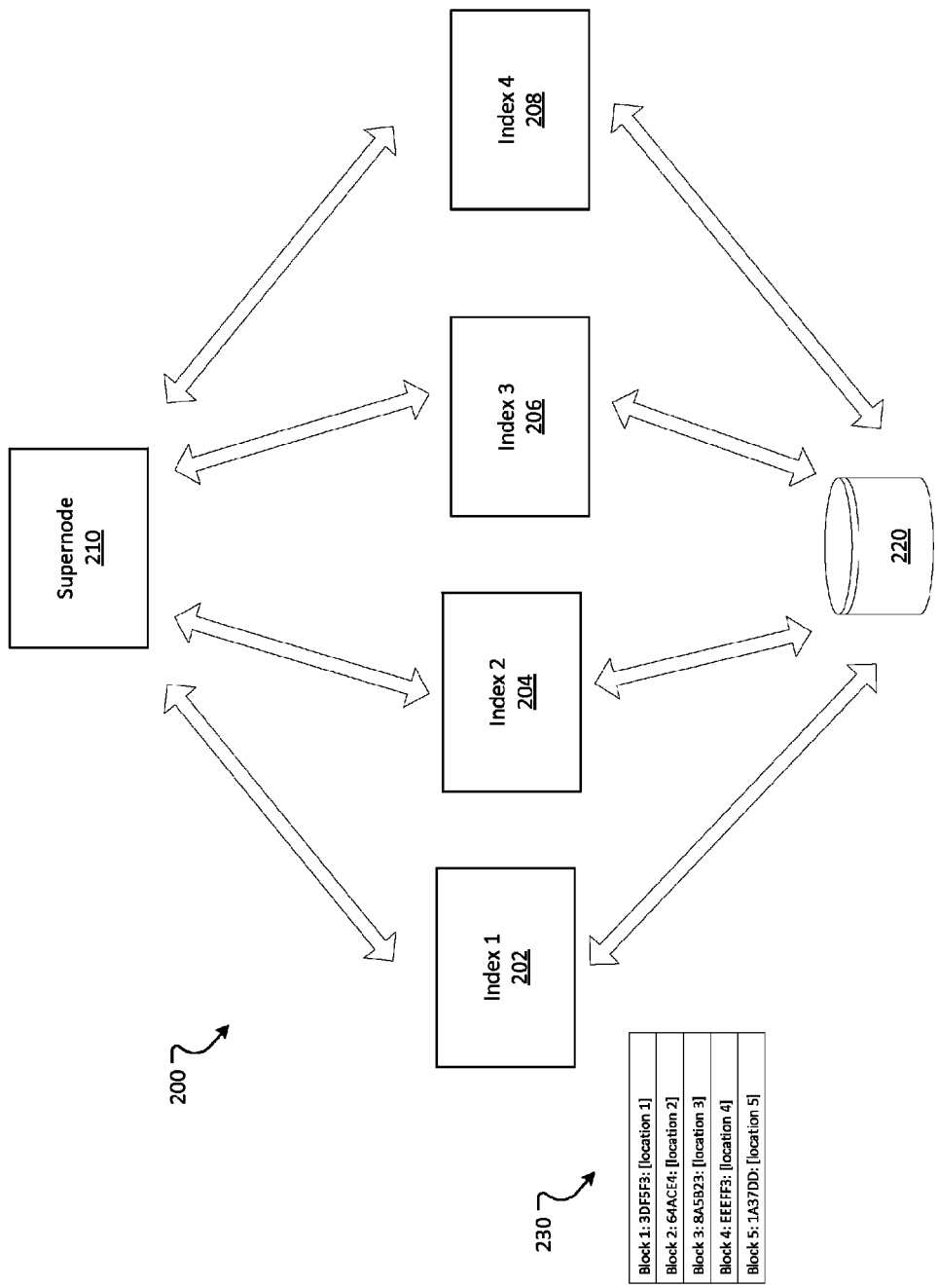
FIG. 2A shows an example of a deduplication system.

FIG. 2A shows an example of a deduplication system 200 in which there are four index nodes 202, 204, 206, 208. Any or all of the index nodes 202, 204, 206, 208 may store entries referencing data stored on a storage medium 220 (e.g. a storage volume such as a disk drive or multiple storage volumes). In some implementations, each of the index nodes 202, 204, 206, 208 contains its own map 230 of index entries each indicating where in the storage medium 220 a particular portion of data is stored. If an index node 202 receives a request to perform an operation on a portion of data, the index node 202 can consult its own map 230 of entries to determine where the portion of data is stored. In some implementations, the index node 202 stores a constant or variable of number of index entries. For example, each index node 202, 204, 206, 208 can store the index entries most recently used by that node. In some implementations, each entry of the map 230 includes an identifier corresponding to the particular portion of data and metadata indicating the location where the particular portion of data is stored in the data storage system. The identifier can include a data value computed from the particular portion of data, e.g., a hash value computed using a hash function that accepts the portion of data as input.

As the deduplication system 200 is used, more than one node may store an index entry for the same portion of data. The supernode 210 can be used to keep track of which index node 202, 204, 206, 208 most recently used an index entry for a portion of data. Before an index node 202 consults its own map 230 of entries to determine where the portion of data is stored, the index node 202 can consult the supernode 210 to determine which index node 202, 204, 206, 208 most recently used an index entry referencing that portion of data. If the most recently used index node was the same index node 202, then the index node 202 can consult its own map 230 of entries to determine where the portion of data is stored in the storage medium 220. If the most recently used index node was one of the other index nodes 204, 206, 208, then the index node 202 can consult the other index node 204, 206, 208 and also update its own map 230 of entries based on the entry provided by the other index node 204, 206, 208.

In some implementations, the map 230 of entries stores entries using a sampling technique. For example, the entries can be stored based on a sampling rate applied to the identifiers. Rather than store an entry for every portion of data that has been accessed by a node, entries for a subset (sample) of the portions of data can be stored. For example, an entry for every other accessed portion of data can be stored, or an entry for every tenth accessed portion of data can be stored, or an entry for some other subset of the accessed portions of data can be stored. Further, different sampling rates can be used, so that entries for portions of data that have not been accessed recently are least likely to be stored in the map 230.

Figure 2B:
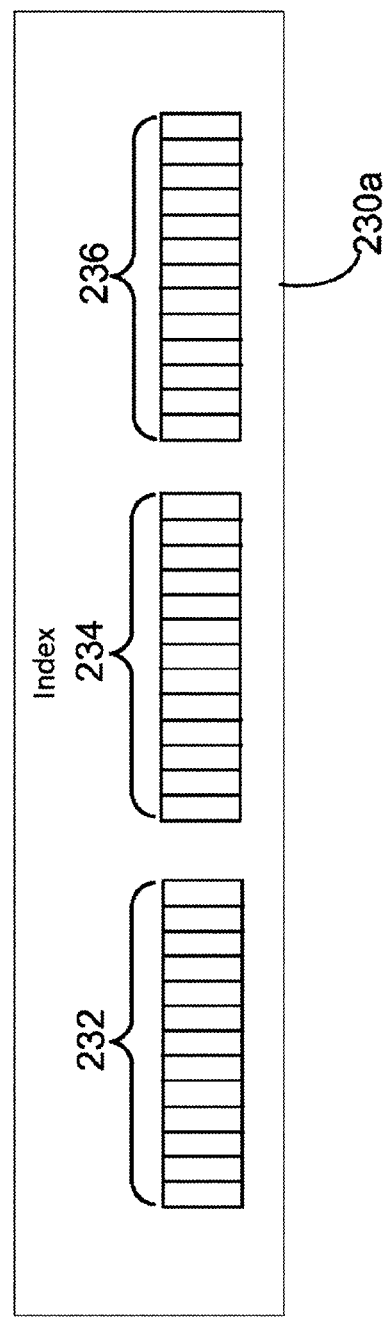
FIG. 2B shows an example of a map.

FIG. 2B shows an example of a map 230a using a sampling technique. The map 230a is divided into three segments 232, 234, 236. Each segment 232, 234, 236 has a different sampling rate. For example, the first segment 232 can have a sampling rate of 100%, and the second segment 234 can have a sampling rate of 50%, and the third segment 236 can have a sampling rate of 10%. Further, each segment can store entries based on when the portion of data corresponding to the entry was most recently accessed. The segment 232 having the highest sample rate can store the entries corresponding to the most recently accessed portions of data, and the segment 236 having the lowest sample rate can store the entries corresponding to the least recently accessed portions of data. Further, entries can be moved from one segment to another according to their age. In this way, the oldest entries are most likely to be deleted. Further information about sampling can be found in U.S. patent application Ser. No. 13/288,440, titled "Indexing Deduplicated Data," which is hereby incorporated by reference in its entirety.

Figure 3:
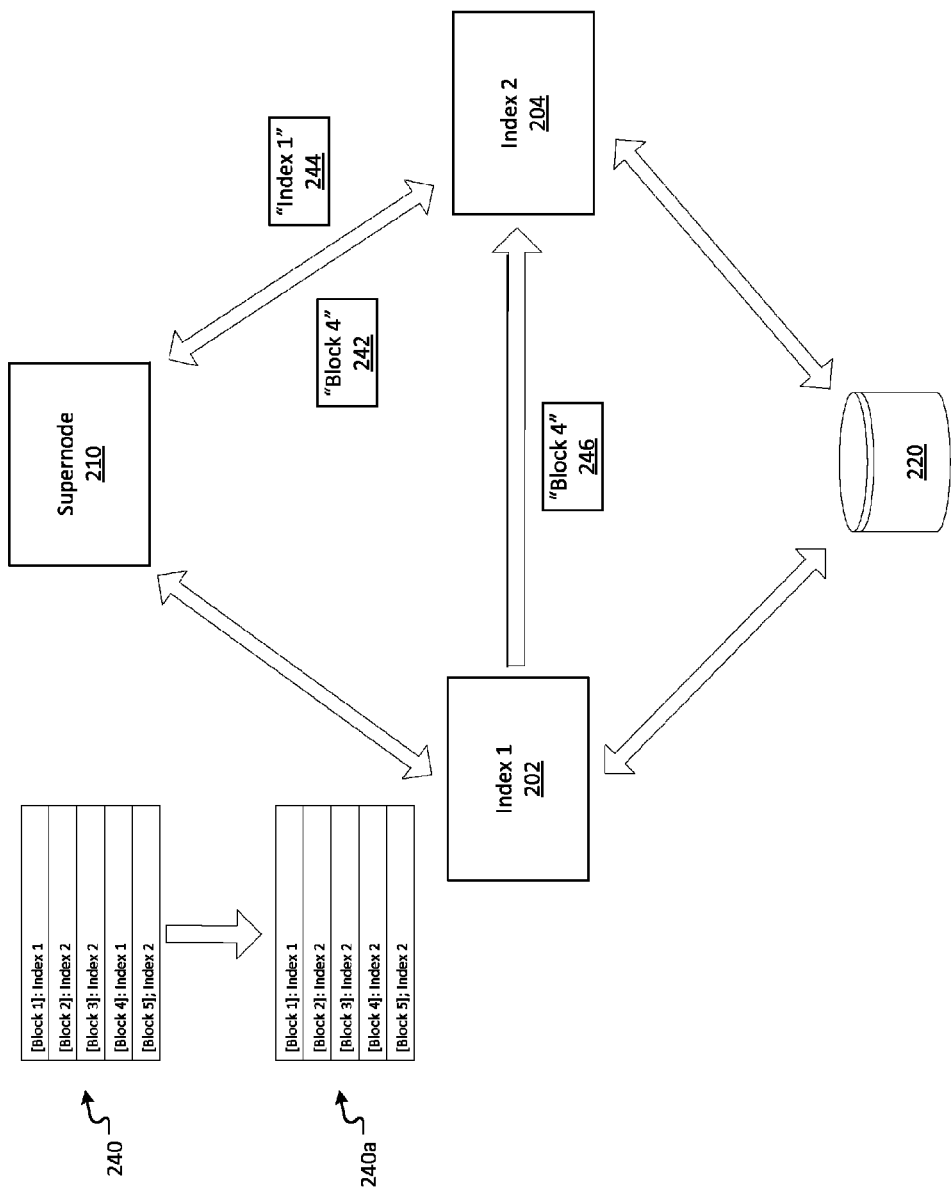
FIG. 3 shows an example interaction.

FIG. 3 shows an example interaction between a supernode 210 and index nodes 202, 204. In this example, the supernode 210 stores a map 240 of node entries. Each entry in the map 240 of node entries includes an identifier corresponding to a particular portion of data stored in the storage medium and a name of an index node that recently submitted a request for that identifier.

In the example shown, one index node 204 ("Index 2") receives a request to perform an operation on a piece of data, here identified as "Block 4." Before consulting its own map of index entries, the index node can submit an identifier 242 of the block to the supernode 210. For example, the index node 204 may submit a value (e.g., a hash value) corresponding to the portion of data to the supernode 210.

In response, the supernode 210 can check the map 240 of node entries to determine which index node most recently requested an index entry corresponding to the portion of data. In this example, the map 240 of node entries indicates that another index node 202 ("Index 1") most recently requested an index entry corresponding to the portion of data. Accordingly, the supernode 210 sends a message 244 to the index node 204 indicating the name of the other index node 202 ("Index 1") that most recently requested an index entry corresponding to the portion of data. The index node 204 can then make a request to the other index node 202 for the index entry 246 corresponding to the portion of data. Further, the supernode 210 can update the map of node entries indicating that the index node 204, "Index 2," most recently requested the index entry, as reflected in the updated map 240a of entries.

Some techniques can improve efficiency by reducing the number of requests among index nodes. In some implementations, the index node 204 may make a request to the other index node 202 for other index entries related to the requested index entry 246. In some examples, the index entry 246 may represent a block of data among multiple related blocks of data. For example, the index entry 246 could represent the first block of data of a data file. In this scenario, the index node 204 could request from the other index node 202 the other index entries for a data file containing the first index entry 246 as part of the request for index entry 246. In some examples, the other entries for the data file were stored at the same time as the first index entry 246 and can be identified based on their time of storage. In some examples, multiple entries representing blocks of the same data file are stored with metadata identifying the blocks as portions of the same data file. Frequently, accessing the first block of file is often followed by accesses to other blocks of the same file. Thus, these techniques can improve efficiency because a single request can return multiple relevant blocks of data.

Figure 4:
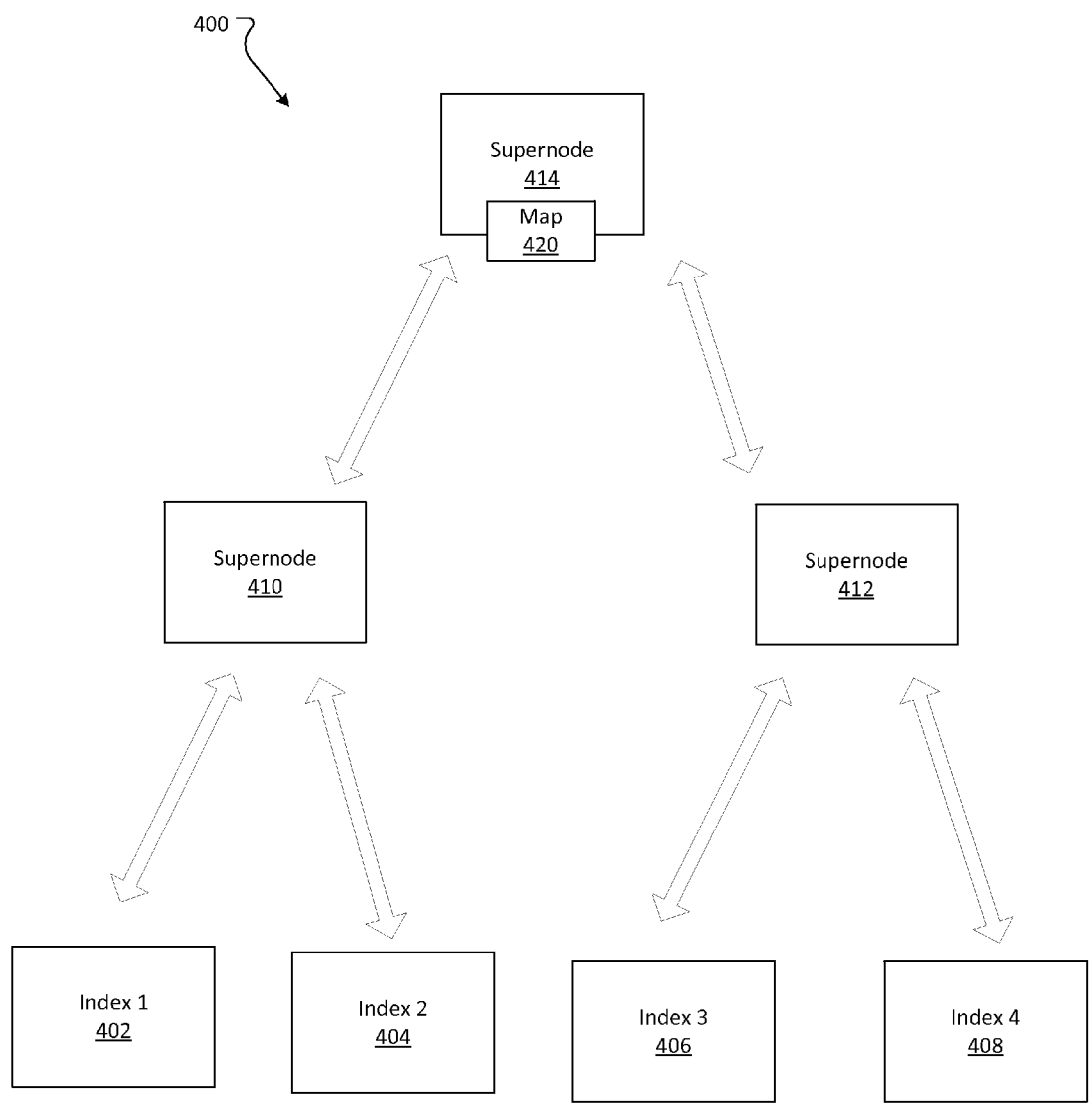
FIG. 4 shows an example of a data deduplication system that uses multiple supernodes.

FIG. 4 shows an example of a data deduplication system 400 that uses multiple supernodes. In this example, two index nodes 402, 404 communicate with one supernode 410, and two other index nodes 406, 408 communicate with another supernode 412. For example, one supernode 410 maintains a map of node entries indicating which of the two index nodes 402, 404 most recently requested an index entry, and the other supernode 412 maintains a map of node entries indicating which of the two index nodes 406, 408 most recently requested an index entry. Because any of the index nodes 402, 404, 406, 408 may have most recently requested an index entry for a particular portion of data, the supernodes 410, 412 can coordinate among themselves to determine which of the index nodes 402, 404, 406, 408 most recently requested an index entry for a particular portion of data. In some implementations, each of the supernodes 410, 412 communicates with a second-order supernode 414, which maintains a map 420 of supernode entries. The second-order supernode 414 keeps track of which supernode 410, 412 most recently handled a request from an index node 402, 404, 406, 408 to identify the index node which most recently requested an index entry for a particular portion of data. For example, when a supernode 410 receives a request from an index node 402 for which index node most recently accessed an index entry for a particular portion of data, the supernode 410 can first consult the second-order supernode 414 to determine if the other supernode 412 handled a request to identify the index node which most recently accessed an index entry for a particular portion of data. If the other supernode 412 more recently handled such a request, the supernode 410 can make an inquiry to the other supernode 412 to identify the index node which most recently accessed the index entry. The supernode 410 can then communicate this information to the index node 402 that made the original request.

This arrangement could be used with a hierarchy of supernodes with additional levels. For example, multiple second-order supernodes could be used, and those could communicate with a third-order supernode which keeps track of which second-order supernode most recently handled a request for which supernode handled a request to identify the index node which most recently accessed an index entry for a particular portion of data.

Figure 5:
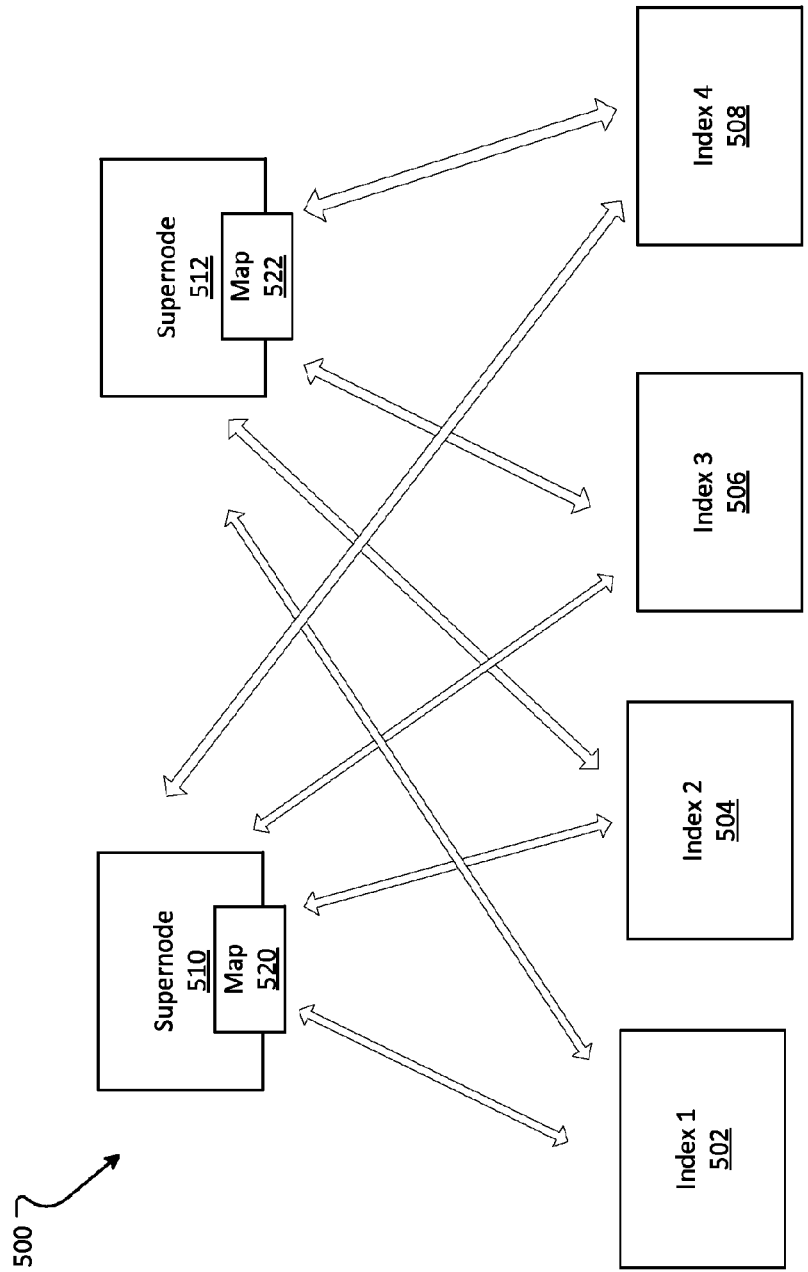
FIG. 5 shows an example of another data deduplication system.

FIG. 5 shows an example of another data deduplication system 500 that uses multiple supernodes. In this example, four index nodes 502, 504, 506, 508 communicate with two supernodes 510, 512. In contrast to the examples above, in which each supernode is associated with a single complete map, in this example, the map indicating which nodes most recently requested an index entry can be split among the supernodes 510, 512. For example, the first supernode 510 can contain one portion 520 of the map, and the second supernode 512 can contain another portion 522 of the map. In some implementations, node entries can be stored in each portion 520, 522 depending on characteristics of the node entry. For example, node entries for one range of blocks (e.g., blocks 1-1000) can be stored in one portion 520, and node entries for another range of blocks (e.g., blocks 1001-2000) can be stored in another portion 522. In this example, each index node 502, 504, 506, 508 communicates with the appropriate supernode 510, 512 based on the characteristic of the block which the node is requesting. In some examples, supernodes need not contain portions of the map equal in size. For example, if there are two supernodes, one of which has twice the memory of the other, ⅔ of the entries could be given to the larger supernode. In some examples, entries could be assigned to supernodes based on domain tags.

This arrangement could also be used in an implementation in which each index node also functions as a supernode. For example, each index node could store a portion of the map of node entries and each index node could consult the appropriate other index node based on a characteristic of the node entry. In the example shown in FIG. 5, there could be four portions of the map of node entries rather than the two portions 520, 522 shown and each of the four portions could be stored by one of the index nodes 502, 504, 506, 508, respectively. In this arrangement, separate supernodes need not be used.

Figure 6:
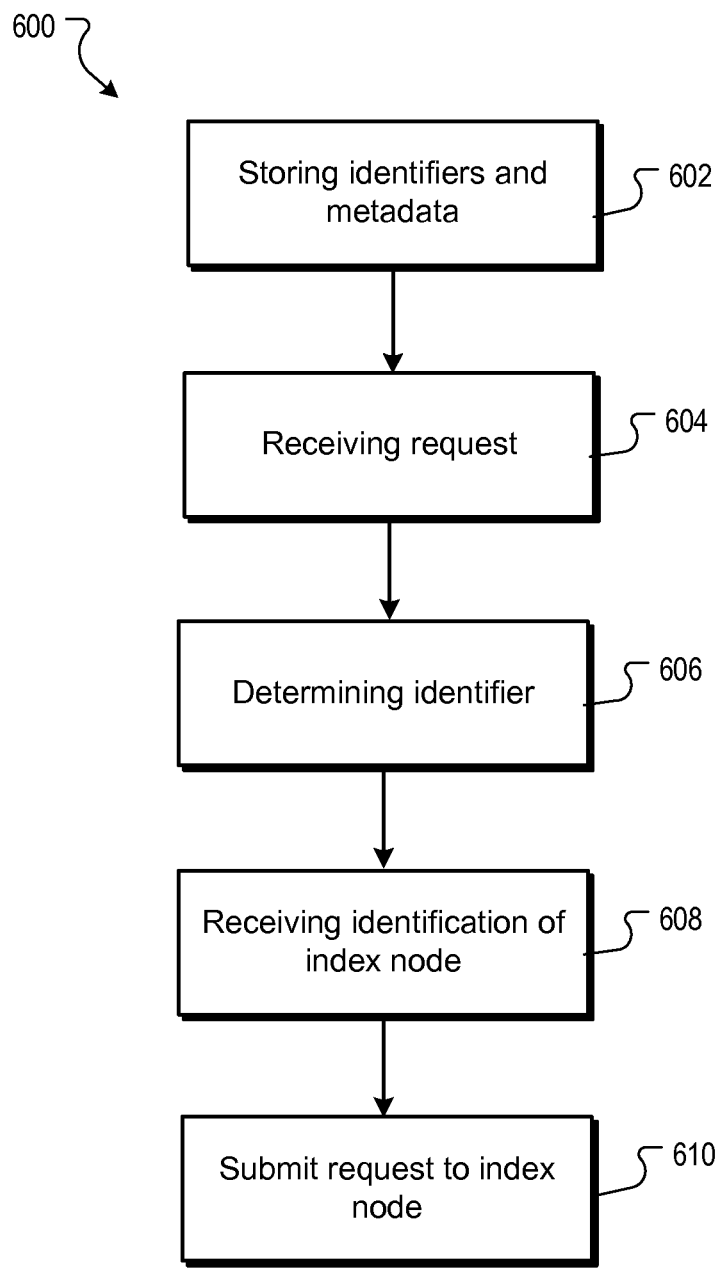
FIG. 6 shows a flowchart for an example procedure.

FIG. 6 shows a flowchart for an example procedure 600 for managing data in a data storage system. The procedure 600 can be carried out by any number of systems, for example, an index node such as one of the index nodes 202, 204, 208 shown in FIG. 2. The procedure includes storing 602 identifiers corresponding to a particular portion of data stored in a data storage system, and also storing metadata indicating a location where the respective particular portion of data is stored in the data storage system.

The procedure also includes receiving 604 a request to access a first portion of data stored in the data storage system. For example, the portion of data could be a block of data stored on a storage medium, and the request could be in response to an application program running on a computer system submitting a request to an operating system to access the block of data.

The procedure also includes determining 606 an identifier corresponding to the first portion of data. In some implementations, this could include computing a data value for the identifier by applying a function (e.g., a hash function) to the first portion of data. In some implementations of the procedure 600, a request for the identification of a second index node that recently submitted a request for the identifier corresponding to the first portion of data is submitted to a supernode storing the identifier corresponding to the first portion of data and a name of the second index node that recently submitted a request for that identifier.

The procedure also includes receiving 608 an identification of a second index node that recently submitted a request for the identifier corresponding to the first portion of data. The second index node stores the identifier corresponding to the first portion of data and stores metadata indicating a location where the first portion of data is stored in the data storage system. In some examples, the index node that recently submitted the request for the particular identifier is the index node that last submitted the request for the particular identifier.

The procedure also includes submitting 610 a request to the second index node for the metadata indicating the location where the first portion of data is stored in the data storage system. In some implementations of the procedure 600, a request is submitted to the second index node for metadata indicating locations where other portions of data are stored in the data storage system. The other portions of data may have been stored at approximately the same time as the portion of data corresponding to the initially requested identifier.

The techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, hard drive, solid state medium, or other computer-readable storage device, readable by a general or special purpose programmable computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

Many other implementations of the invention other than those described above are within the invention, which is defined by the following claims.

What is claimed is:

1. A system for managing data in a data storage system, the system comprising:
   a plurality of index nodes, each index node configured to store a map of entries in a data storage apparatus, each entry of the map including: 1) an identifier corresponding to a particular portion of data stored in the data storage system, and 2) metadata indicating a location where the particular portion of data is stored in the data storage system;
   a supernode of one or more supernodes configured to store, in the data storage apparatus, a supernode map of entries, each entry in the supernode map of entries including: 1) an identifier that corresponds to a particular portion of data stored in the data storage system, and 2) an index node identifier of an index node of the plurality of index nodes that recently submitted a request for the identifier;
   wherein an index node of the plurality of index nodes is configured to:

receive a first request to perform an operation on a first portion of data;

in response to the first request, submit a second request to the supernode for an identification of an index node of the plurality of index nodes that recently submitted the request for the first portion of data, and wherein the supernode is configured to:

receive the second request;

access the supernode map of entries; and return, in response to the second request, the identification of the index node of the plurality of index nodes that recently submitted the request for the identifier associated with the first portion of data;

wherein each index node is assigned to at least one supernode, such that the identifiers stored on each supernode include identifiers stored by the index nodes assigned to that supernode; and wherein each index node is configured to submit a request for an entry of a map corresponding to a particular identifier to an index node identified by at least one of the supernodes as an index node that recently submitted a request for the particular identifier, before consulting its own map of entries for the particular identifier.

2. The system of claim 1, wherein each identifier stored by one of the supernodes is assigned to the respective supernode based on a function applied to a data value of the identifier.

3. The system of claim 1, wherein at least some of the supernodes store the identifiers based on a sampling rate applied to the identifiers.

4. The system of claim 1, wherein at least some of the supernodes are configured to delete entries from the maps stored at the one or more supernodes based on an age of each deleted entry.

5. The system of claim 1, wherein each index node is assigned to a single supernode.

6. The system of claim 1, wherein each index node is assigned to at least two supernodes.

7. The system of claim 1, wherein each map of entries stored at the one or more supernodes is stored by a single supernode.

8. The system of claim 1, wherein each map of entries stored at the one or more supernodes is stored by at least two supernodes, each of the at least two supernodes storing a portion of the respective map of entries stored at the one or more supernodes.

9. The system of claim 1, wherein the one or more supernodes are configured to send an identification of the index node that most recently submitted a request.

10. The system of claim 9, wherein the one or more supernodes are configured to send a message to at least one of the index nodes, the message comprising the identification of the index node that most recently submitted the request, the at least one of the index nodes receiving the message configured to submit a request to the index node identified by the message.

11. The system of claim 1, wherein the one or more supernodes are configured to update the maps of entries stored at the one or more supernodes, the update indicating the index node that most recently submitted a request.

12. The system of claim 1, wherein at least one of the identifiers includes a data value computed from the particular portion of data.

13. The system of claim 1, wherein at least some of the index nodes are configured to submit a request, to the index node identified by at least one of the supernodes, for other entries of the map related to the initially requested entry of the map.

14. The system of claim 13, wherein the other entries related to the initially requested entry were stored at approximately the same time as the initial entry.

15. The system of claim 1, comprising a second supernode configured to return an identification of one of the supernodes that recently submitted a request for a particular identifier associated with at least one of the portions of data.

16. The system of claim 1, wherein the index node that recently submitted the request for the particular identifier comprises the index node that last submitted the request for the particular identifier.

17. The system of claim 1, wherein a first entry of a first map of entries stored by a first index node of the index nodes and a second entry of a second map of entries stored by a second index node of the index nodes are associated with the same particular portion of data.

18. The system of claim 1, wherein at least one of the supernodes is configured to keep track of which index node most recently submitted a request for a particular identifier.

19. The system of claim 1, wherein at least some of the index nodes are each configured to update its respective map of entries based on an entry provided by another index node.

20. The system of claim 1, wherein the metadata comprises an indication that the particular portion of data is associated with at least one duplicate of the particular portion of data.

21. The system of claim 1, wherein at least one of the index nodes is configured to, before consulting its own map of entries for a particular identifier, submit a request to another index node, the other index node corresponding to the identification returned by at least one of the supernodes, the request being for a first entry of a map and other entries of the map, the first entry corresponding to the particular identifier, and the other entries stored at approximately the same time as the first entry.

22. The system of claim 1, comprising a hierarchy of supernodes, wherein the hierarchy of supernodes comprises one or more higher-order supernodes and one or more lower-order supernodes.

23. The system of claim 22, wherein the one or more higher-order supernodes communicate with the one or more lower-order supernodes and are configured to return an identification of one of the lower-order supernodes that recently submitted a request for a particular identifier associated with at least one of the portions of data.

24. The system of claim 1, wherein each of the index nodes stores a portion of the map of node entries and wherein each index node of the plurality is configured to communicate with the other index nodes of the plurality based on characteristics of node entries in the map of node entries stored in the other index nodes.

25. The system of claim 1, wherein, in response to a determination that the single index node that recently submitted the request for the particular identifier associated with the at least one of the portions of data is not the index node, the index node is configured to replace a portion of data stored in the data storage system with the identifier corresponding to the particular portion of data stored in the data storage system.

26. The system of claim 1, wherein the index node of the plurality of index nodes is configured, in response to receiving the identification, to submit a request for the at least one of the portions of data from the single index node.

27. The system of claim 1, comprising a data processing apparatus configured to, in response to deduplication advice indicating a portion of data having a duplicate being stored in the data storage system, determine whether to represent the portion of data having the duplicate using a reference to the duplicate instead of the portion of data.

28. A method for managing data in a data storage system, the method comprising:
   on a first index node of a plurality of index nodes, storing identifiers corresponding to a particular portion of data stored in the data storage system and storing metadata indicating a location where the respective particular portion of data is stored in the data storage system;
   receiving a first request to access a first portion of data stored in the data storage system;
   sending, by the first index node to a supernode, a second request for an identification of an index node of the plurality of index nodes that recently submitted a request for the first portion of data, wherein the supernode maintains a supernode map of entries, each entry in the supernode map of entries including: 1) an identifier that corresponds to a particular portion of data stored in the data storage system, and 2) an index node identifier of the index node of the plurality of index nodes that recently submitted the request for the identifier;
   receiving, by the first index node from the supernode, an identification of a second index node that recently submitted a request for the identifier corresponding to the first portion of data, the second index node included among the plurality of index nodes and storing the identifier corresponding to the first portion of data and storing metadata indicating a location where the first portion of data is stored in the data storage system; and
   submitting, by the first index node to the second index node, a third request to the second index node for the metadata that indicates the location where the first portion of data is stored in the data storage system;
   wherein each index node is assigned to the supernode, such that the identifiers stored on the supernode include identifiers stored by the index nodes assigned to the supernode; and
   wherein each index node is configured to submit a request for an entry of a map corresponding to a particular identifier to an index node identified by the supernode as an index node that recently submitted a request for the particular identifier, before consulting its own map of entries for the particular identifier.

29. The method of claim 28, wherein determining an identifier corresponding to the first portion of data comprises computing a data value for the identifier by applying a function to the first portion of data.

30. The method of claim 29, wherein the function is a hash function.

31. The method of claim 28, comprising submitting a request to the second index node for metadata indicating locations where other portions of data are stored in the data storage system, the other portions of data having a relation to the portion of data corresponding to the initially requested identifier.

32. The method of claim 31, wherein the other portions of data related to the portion of data corresponding to the initially requested identifier were stored at approximately the same time as the portion of data corresponding to the initially requested identifier.

33. The method of claim 28, wherein the index node that recently submitted the request for the particular identifier comprises the index node that last submitted the request for the particular identifier.

34. The method of claim 28, comprising determining whether the second index node corresponds to the index node that most recently submitted the request for the identifier corresponding to the first portion of data.

35. A system for managing data in a data storage system, the system comprising:
   one or more data processing apparatus;
   one or more memory storage apparatus in communication with the one or more data processing apparatus and with each other; and
   a collection of index nodes and supernodes arranged in a hierarchy in which each index node is below at least one supernode in the hierarchy, such that a supernode above an index node in the hierarchy is configured to, upon request from the index node, identify to the index node which other index node most recently submitted a request for an identifier of a particular portion of data,
   wherein, in response to a request to perform an operation on the particular portion of data, the index node of the collection of index nodes is configured to submit to the supernode the request for an identification of the other index node that recently submitted the request for the identifier associated with the particular portion of data;
   wherein at least one of the supernodes stores a map of entries, each entry of the map including an identifier corresponding to a particular portion of data stored in the data storage system and an index node identifier of an index node that most recently submitted a request for that identifier;
   wherein each index node is assigned to at least one supernode, such that identifiers stored on each supernode include identifiers stored by the index nodes assigned to that supernode; and
   wherein the index nodes each store a map of entries, at least some of the entries corresponding to a particular identifier, each index node configured to submit a request, for an entry of a map corresponding to the particular identifier, to an index node identified by the supernode, the supernode being above the corresponding configured index node in the hierarchy, as the index node that most recently submitted a request for the particular identifier, before consulting its own map of entries for the particular identifier.

36. The system of claim 35, wherein at least some of the supernodes are configured to delete entries from the map stored by the respective supernode based on an age of each deleted entry.

37. The system of claim 35, wherein at least one of the supernodes is configured to update its stored map of entries, the update comprising an indication of the index node that most recently submitted a request.

38. The system of claim 35, wherein at least some of the index nodes are configured to submit a request, to the index node identified by the supernode, the supernode being above the corresponding configured index node in the hierarchy, for other entries of the map related to the initially requested entry of the map.

39. The system of claim 35, comprising a second supernode configured to return an identification of one of the supernodes that most recently submitted a request for a particular identifier associated with at least one of the portions of data.

40. The system of claim 35, wherein at least one of the collection of index nodes and supernodes comprises at least one of at least a portion of a computer system and at least a portion of a computer program.

41. A system for managing data in a data storage system, the system comprising:
  one or more data processing apparatus; and
  one or more memory storage apparatus in communication with the data processing apparatus and with each other;
  a plurality of index nodes, wherein at least one of the index nodes comprises at least one of at least a portion of a computer system and at least a portion of a computer program, each index node configured to store a map of entries, at least some of the index nodes are each configured to update its respective map of entries, each entry of the map including i) an identifier corresponding to a particular portion of data stored in the data storage system, at least one of the identifiers including a data value computed from the particular portion of data, the identifier being associated with data identifying the respective index node configured to store the map which includes the identifier, and ii) metadata indicating a location where the particular portion of data is stored in the data storage system, and
  wherein, in response to a request to perform an operation on the particular portion of data, an index node of the plurality of index nodes is configured to submit a request to a supernode for an identification of a single index node that recently submitted a request for a particular identifier associated with at least one of the portions of data, and
  wherein the index node of the plurality of index nodes is configured, in response to receiving the identification of the single index node from the supernode, to submit the request for the at least one of the portions of data to the single index node;
  wherein the supernode stores a map of entries, each entry of the map including an identifier corresponding to a particular portion of data stored in the data storage system and an index node identifier of an index node that most recently submitted a request for that identifier;
  wherein each index node is assigned to the supernode, such that identifiers stored on the supernode include identifiers stored by the index nodes assigned to that supernode; and
  wherein each index node is configured to submit a request for an entry of a map corresponding to a particular identifier to an index node identified by the supernode as an index node that recently submitted a request for the particular identifier, before consulting its own map of entries for the particular identifier.

42. The system of claim 41, wherein the index node that recently submitted a request comprises the index node that last submitted the request.

\* \* \* \* \*